United States Patent [19]
Rose

[11] Patent Number: 5,293,151
[45] Date of Patent: Mar. 8, 1994

[54] AUDIBLE WARNING OF DISEMBARKED BUS PASSENGERS

[76] Inventor: Dean E. Rose, 2843 Ross Rd., Sunbury, Ohio 43074

[21] Appl. No.: 952,973

[22] Filed: Sep. 29, 1992

[51] Int. Cl.⁵ ............................................. B60Q 1/26
[52] U.S. Cl. ................................... 340/433; 340/901; 116/28 R
[58] Field of Search ............... 340/433, 480, 901, 905; 296/1.1; 293/9, 117; 116/28 R; 180/271

[56] References Cited
U.S. PATENT DOCUMENTS 4,339,744  7/1982  Latta, Jr. ............................... 340/433
4,559,517  12/1985  Rahn ..................................... 340/433
5,132,662  7/1992  Burch .................................... 340/433

Primary Examiner—Jeffrey Hofsass
Attorney, Agent, or Firm—Mueller and Smith

[57] ABSTRACT

An audible warning cue signal of a selected duration is provided to disembarked passengers to warn them of the impending departure of the vehicle from which they disembarked. The vehicle is stopped at a predetermined location for passenger debarkation. An entrance door of the vehicle is then actuated to an opened condition to allow the passengers to disembark. After the passengers have disembarked, the door is actuated to a closed condition and an audibly perceptible alarm is provided for a selected time duration to aurally alert the disembarked passengers to the impending departure of the vehicle.

21 Claims, 2 Drawing Sheets

AUDIBLE WARNING OF DISEMBARKED BUS PASSENGERS

BACKGROUND OF THE INVENTION

From 1951-1990, in the state of Ohio alone, over 40 students were killed in accidents outside of school buses. An appreciable number of these fatalities resulted from children wandering into the path of the bus as it departed from the drop site. A small child, even when crossing directly in front of the bus, may be obscured from the view of the driver who must also be attuned to approaching traffic as well as to disembarking children. Complicating the problem is the tendency of child to dawdle around the bus or to chase papers and the like underneath the bus rather than to proceed directly out of harm's way upon disembarking. Tragically, a disembarked child who has strayed too near the bus, his or her attention directed elsewhere, may be unaware of the danger engendered by the departure of the bus until it is too late for either the driver or the child to avoid a serious accident.

To militate against accidents caused by oncoming traffic and the like, many school buses have been equipped with various safety devices. School buses commonly employ red and amber signal lamps and a stop arm to alert traffic of an impending stop. In operation, with the entrance handle closed, the driver actuates a manual switch to activate the flashing of the amber signal lamps to indicate the stopping of the bus. When the entrance door handle is moved toward the open position, the amber warning lights are deactivated and the red warning lights are actuated to indicate that children are departing from the bus. Concomitantly, a stop arm is extended to reveal additional flashing red lights as well as a stop sign configured in the symbolic shape of an octagon. When the entrance door handle is closed, all the lights are deactivated and the stop arm retracts automatically. School buses also are typically equipped with an audible electrical warning device that is actuated when the bus is in reverse gear. An audible warning signal is maintained as long as the bus is in reverse gear.

Although the aforementioned devices have been shown to reduce the number of fatalities associated with student busing, school districts are continually searching for ways of making student transport safer. Accordingly, there has existed and remains a need for ways of alerting students to the danger attending a school bus departing from its drop site.

SUMMARY

The present invention is addressed to an audible warning method for school buses and the like. By providing a cueing signal of a selected duration that may be audibly perceived, the present invention warns disembarked passengers, especially children, of the impending departure of the bus. Alerted to the danger, the disembarked passengers may take evasion action to avoid being struck by the bus as it leaves the drop site. Advantageously, even those passengers who are obscured from the view of the driver also are warned of the danger. Moreover, the warning may be provided automatically upon the closing of the bus door. The driver's attention therefore need not be diverted to operation of the alarm, but instead may remain focused on the passengers or on traffic.

Accordingly, it is a feature of the present invention to provide a method for warning disembarked passengers of the impending departure of the vehicle from which they disembarked. The method entails stopping the vehicle at a predetermined location for passenger debarkation. An entrance door of the vehicle is then actuated to an opened condition to allow the passengers to disembark. After the passengers have disembarked, the door is actuated to a closed condition and an audibly perceptible alarm is provided for a selected time duration to aurally alert the disembarked passengers to the impending departure of the vehicle.

The invention, accordingly, comprises the method possessing the combination of steps which are exemplified in the following detailed disclosure. For a fuller understanding of the nature and objects of the invention, reference should be had to the following detailed description taken in connection with the accompanying drawings.

DETAILED DESCRIPTION OF THE INVENTION

In the discourse to follow, the disembarked passenger audible warning method of the instant invention is considered initially in conjunction with a description of the operational logic employed. Although the logic is described as applied to the incorporation of the present inventive method into the operation of a school bus, it may be understood that the invention may be used with any passenger-carrying vehicle having an entrance door for the egress of passengers therethrough. Subsequently, the discourse turns to a description of an electrical circuit suited for effectuating the objects and precepts of the instant invention. Although the described circuit is analog-based, it is to be understood that a partially-analog or a digital electronic arrangement may also be employed to carry out the method of the present invention.

Figure 1:
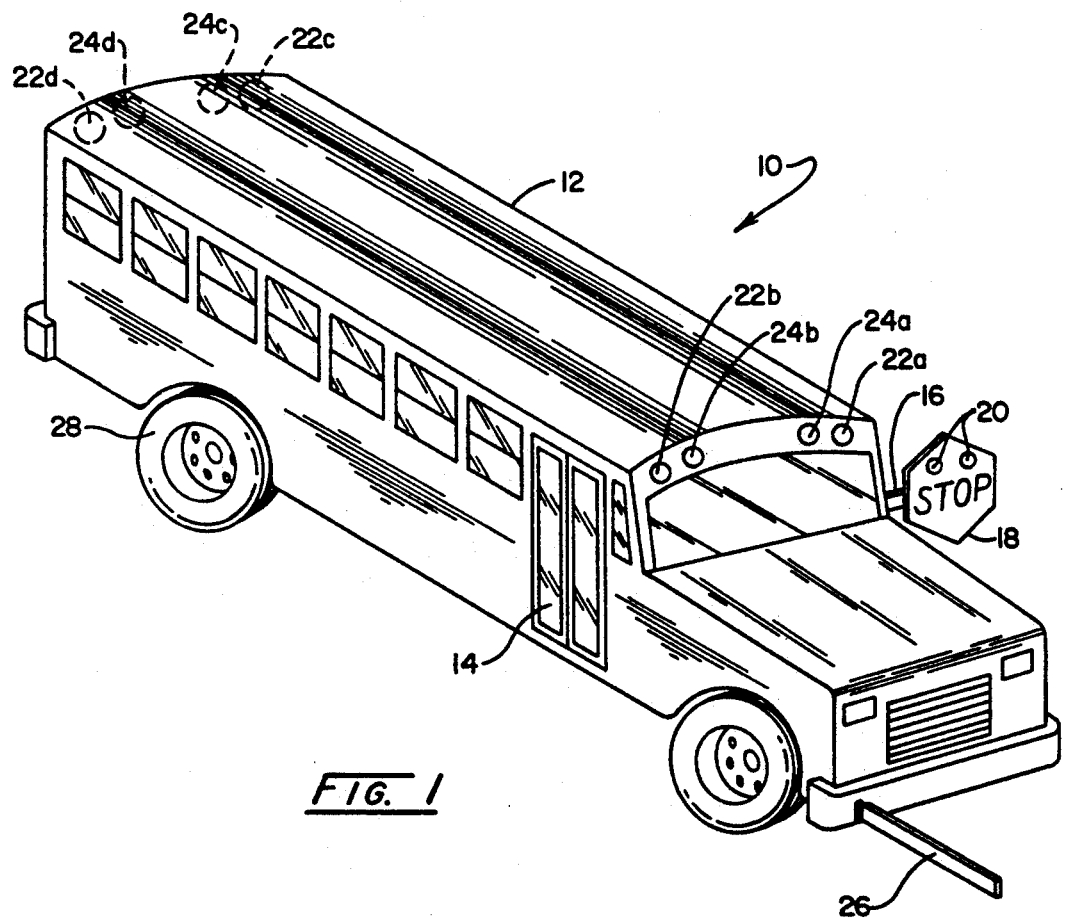
FIG. 1 is a side elevational view of a school bus.

Looking initially to FIG. 1, the ubiquitous school bus is shown generally at 10 as having a body, 12, and a driver-actuatable entrance door, 14. Mounted onto body 12 may be seen a number of conventional safety devices which may be operated in combination with the present invention. Considering these safety devices, an extensible stop arm, 16, may be provided to be extensible from a retracted to an extended orientation. Typically, a red sign, 18, having the familiar octagonal icon and customarily bearing the word "STOP" is mounted onto the end of stop arm 16 to visibly cue passing motorists to bring their vehicles to a stop. The visual effect of sign 18 is often enhanced by providing it with a pair of flashing red warning lights, 20. Motorists are also provided visual cues via the flashing of warning lights which are conspicuously mounted on both the front and the rear of bus 10. An arrangement of red child pick-up lights, 22a-d, and amber caution lights, 24a-d, is generally employed. A crossing arm, 26, also may be provided to be extensible from a retracted to an extended orientation for directing disembarking passengers to cross in front of the bus at a distance placing them within the unobstructed view of the driver.

Figure 2:
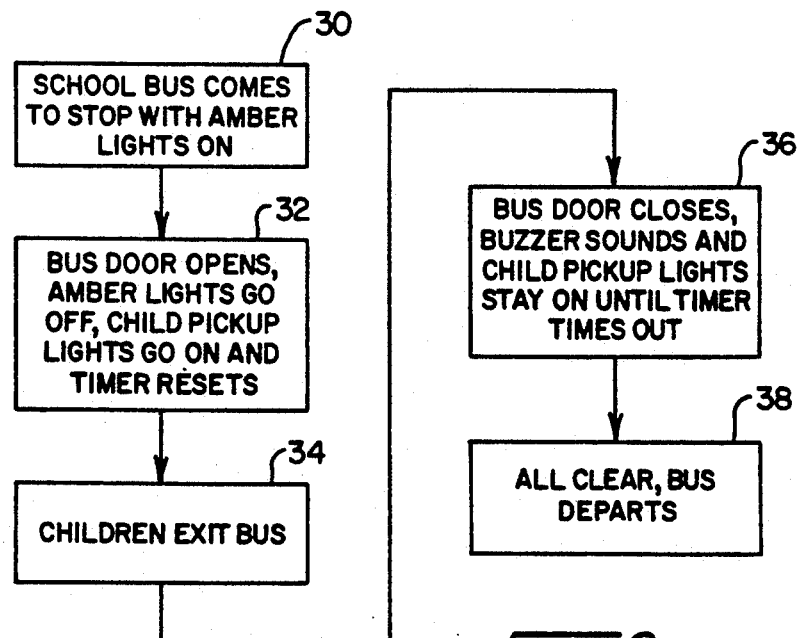
FIG. 2 is a flow diagram representing the logic employed in accordance with the present invention.

Referring also to FIG. 2, a flow chart representing the general logic and mode of operation employed to effect the object and precepts of the present invention in connection with the operation of school bus 10 is revealed generally at 29. Considering the schematic in detail, the operational logic of the instant method for audibly warning disembarked passengers of the impending departure of the vehicle from which they disembarked is begun at block 30. At block 30 it is revealed that, initially, a stopping of bus 10 is effected to allow for passengers carried therein to disembark. To alert following and oncoming traffic of the stopping of the bus, amber caution lights 24a-d mounted on body 12 of bus 10 are actuated. Amber caution lights 24a-d signal following and oncoming traffic to begin stopping as a safety measure preparatory to the loading or the unloading of children from school bus 10. Then, as revealed at block 32, the bus driver or another operator manually actuates entrance door 14 to an opened condition to allow for the egress of children therethrough. The opening of entrance door 14 also triggers the deactivation of amber caution lights 24a-d and the activation of red child pick-up lights 22a-d as a signal to the motorists that children are now departing or entering the bus and, as is generally mandated under state laws, that the motorists should remain stopped for the duration of the activation of red child pick-up lights 22a-d. Stopping arm 16 and crossing arm 22 also may be extended in response to the occurrence of a door 14 open condition to operate in conjunction with the flashing of red child pick-up lights 22a-d. Occurring concomitantly with the activation of red child pick-up lights 22a-d, a timer provided in accordance with the present invention is reset from a timed to a reset or untimed state. With bus door 14 opened, as revealed at block 34, children are allowed to exit bus 10.

Next, as represented at block 36, upon completion of the debarkation, bus door 14 is actuated from its opened to a closed condition. As is also revealed at block 36, upon the occurrence of the bus door 14 closed condition, an alarm provided in accordance with the present invention is automatically made to sound for a selected duration as determined by the setting of the timer. The alarm may be provided as, for example, a horn or buzzer mounted on body 12 of bus 10. Any disembarked children who have wandered or lingered too near the bus are thereby audibly alerted by the sounding of the warning signal to remain or move clear of bus 10 as it departs. In practice, the alarm should be sounded long enough at a decibel level loud enough to provide an effective aural stimulus ensuring that the all of the disembarked passengers have been warned that bus 10 departure is imminent. However, the horn or buzzer should not be sounded for so long that it unnecessarily delays traffic or the departure of the bus or that it becomes an irritant to those within earshot. Accordingly, it is advantageous for the horn or buzzer to sound for about 3 to 30 seconds, although a duration of about 5 to 15 seconds is preferred. The pitch of the audible warning signal may also be time-dependent or variable over time to connote to the disembarked bus passengers the imminency of the departure of the bus. Alternatively, the audible warning may be provided intermittently towards the end of the signal cycle.

Additionally, and as is also revealed at block 36, red child pick-up lights 22a-d may remain activated for the duration of the sounding of the audible warning signal to thereby provide a supplemental visible warning signal both to disembarked passengers and to adjacent motorists. Preferably, stop arm 16 and crossing arm 26 also remain extended for the duration of the sounding of the audible warning signal and the flashing of red child pick-up lights 22a-d. Finally, as is represented at block 38, assured by both a visual inspection and by the audible and visible warning cues automatically provided that all disembarked passengers are clear of bus 10, the bus may depart the site.

Figure 3:
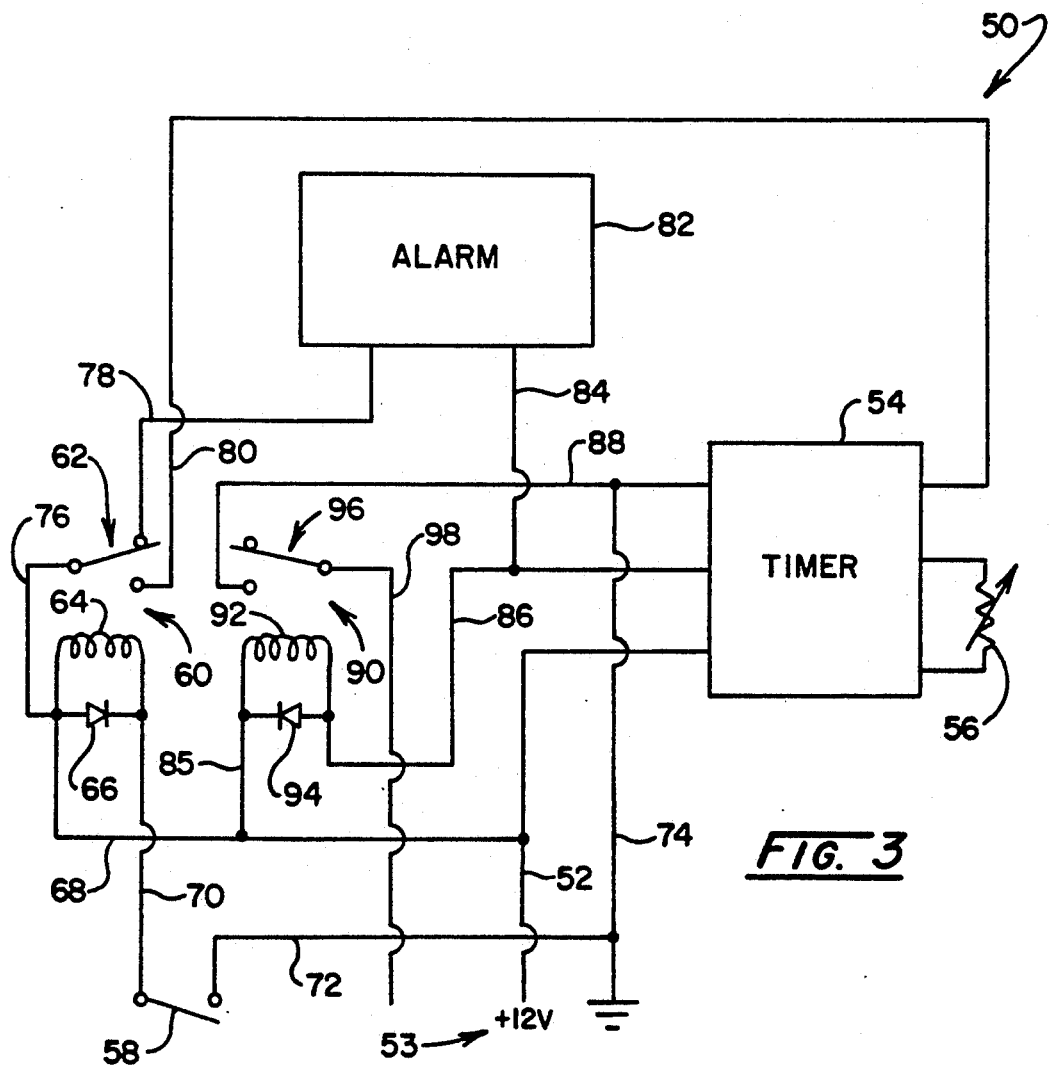
FIG. 3 is an electrical schematic diagram of a circuit for effecting the audible warning of disembarked passengers in accordance with the present invention.

Looking additionally to FIG. 3, an initial embodiment of an electrical circuit for carrying out the audible warning method of the present invention is represented generally at 50. Circuit 50 may be connected via line 52 with the battery (not shown) of bus 10 to thereby provide an uninterrupted power supply at +12 v as is represented at 53. Line 52 is seen to extend directly to the input of a timer represented at block 54. Timer 54 may be provided, for example, as a delay-on-break type wherein power is applied directly to the input at all times prior to and during timing. When an internal initiate or reset switch is closed, the output load transfers and, when closed, the time delay is started. At the conclusion of the delay, the output reverts to its original, unenergized position. Timer 54 may be provided, for example, as a type QBS manufactured by Infitec, Inc. of Syracuse, N.Y. Advantageously, the time delay period timed by the resetting and de-energization of timer 54 may be variably-controlled from, for example, 1 to 100 seconds, by the setting of variable resistor 56 which is integrally-incorporated into timer 54.

Timer 54 may be reset by its energization from a timed to an untimed state by the actuation of switch 58 in connection with the relay shown generally at 60. Switch 58 may be of a normally-open type and may be mechanically-actuated to a closed orientation by the opening of bus door 10. Relay 60 may be seen to be comprised of contacts represented at 62 which may be normally-open to connect lines 76 and 78, relay coil 64, and diode 66. Relay coil 64 is energized via line 68 which extends to +12 v supply 53 via line 52 and by the actuation of switch 58 to a closed orientation which grounds coil 64 via lines 70 and 72 and ground 74 which may extend to the chassis (not shown) of vehicle 10. In an energized state, contacts 62 of relay 60 close to reset timer 54 to a reset or untimed state by supplying +12 v thereto via lines 52, 68, 76, and 80.

Upon the closing of bus door 14 and the concomitant reversion of switch 58 to its normally-open orientation, timer 54 is de-energized via the opening of relay contacts 62 to again latch lines 76 and 78 and to thereby provide +12 v to an alarm, represented at block 82, in conjunction with lines 68 and 52. Alarm 82 may be, for example, a horn or buzzer mounted on body 12 of bus 10 adjacent door 14 and may be provided, for example, as a type ECCO 630 back-up alarm rated at 107 db and having a steel construction meeting all Society of Automotive Engineers (SAE) requirements. A plurality of serially-coupled alarms may also be employed to ensure that an audible warning is provided to those areas outside bus 10 either obstructed from the view of the driver or where children are likely to frequent. For example, a second alarm (not shown) serially-coupled to alarm 82 may be installed on body 12 of bus 10 adjacent passenger-side rear wheel well 28. With timer 54 in its untimed or reset state, alarm 82 is grounded via lines 84, 86, 88, and 74, and, accordingly, is energized until timer 54 times out and again reverts to a timed state. It may be seen that the duration of the audible cue produced by the sounding of alarm 82 upon the closing of door 14 of bus 10 is dependent upon the time delay of timer 54 effectuated by the setting of variable resistor 56.

Advantageously, the energization and timing out of timer 54 may be used to control the actuation of other safety devices carried by bus 10. In this regard, a relay represented at 90 is provided and may be seen to be comprised of relay coil 92, diode 94, and contacts represented at 96. Alternatively, relay 90 may be provided to be the second pole of relay 60. In their normally-open orientation, contacts 96 break or open the circuit formed by lines 52, 68, 85, 86, 88, and 98. Upon the resetting of timer 54 to a reset or untimed condition, however, coil 92 of relay 90 is energized, thereby closing contacts 96 and completing the aforementioned circuit formed by lines 52, 68, 85, 86, 88, and 98. The circuit remains closed to provide +12 v to line 98 until timer 54 reverts to its timed state whereupon relay coil 92 is de-energized and contacts 96 again open and break the circuit. Line 98 may be extended, for example, to control conventional safety devices such as red child pick-up lights 22a-d, stop arm 16 and/or crossing arm 26. By so providing, the actuation of the safety devices carried by bus 10 may be advantageously synchronized. That is, extension of stop arm 16 and crossing arm 26 and the flashing of red child pick-up lights 22a-d may be effected upon the opening of bus door 14 and maintained after the closing of bus door 14 for the duration of the audible cue provided by buzzer 82. Such a synchronization enhances the audible and visible cues provided to both adjacent motorists and to disembarking passengers.

As to installation, circuit 50 may be incorporated into any passenger-carrying vehicle or the like during the assembly thereof or it may be retrofitted into assembled vehicles. Advantageously, such a retrofitting may be readily effected, for example, by connecting line 52 to the nominal +12 v power supply which vehicles such as buses and the like typically carry in the form of a storage battery and by mounting buzzer 82 and timer 54 to the body of the vehicle.

Since certain changes may be made in the above-described method without departing from the scope of the invention herein involved, it is intended that all matter contained in the description thereof or shown in the accompanying drawing shall be interpreted as illustrative and not in a limiting sense.

I claim:

1. In a vehicle for carrying passengers having a door actuatable from a closed to an opened condition for the egress of said passengers, a method for warning disembarked passengers of the impending departure of said vehicle comprising the steps of:
    stopping said vehicle at a predetermined location for passenger debarkation;
    actuating said door to said opened condition to allow said passengers to disembark;
    actuating said door to said closed condition after said passengers have disembarked; and
    automatically providing an audibly perceptible alarm of a select duration to said disembarked passengers upon said actuating of said door to said closed condition.

2. The method of claim 1 further comprising the step of providing a visibly perceptible alarm in response to said door opened condition and for a select time interval after said actuating of said door to said door closed condition after said passengers have disembarked.

3. The method of claim 2 wherein said select time interval after said actuating of said door to said closed condition corresponds to said duration of said audibly perceptible alarm.

4. The method of claim 2 further comprising the steps of:
    providing at least one externally-viewable light mounted on said vehicle; and
    energizing intermittently at least one said light to provide said visibly perceptible alarm.

5. The method of claim 1 further comprising the steps of:
    providing at least one buzzer energizable for providing said audibly perceptible alarm at a pitch, frequency and intensity effective for alerting said disembarked passengers; and
    energizing at least one said buzzer to provide said audibly perceptible alarm.

6. The method of claim 5 wherein a first buzzer is provided adjacent said door of said vehicle.

7. The method of claim 6 wherein a second buzzer serially-coupled to said first buzzer is provided adjacent the passenger-side rear wheel well of said vehicle.

8. The method of claim 1 further comprising the steps of:
    providing at least one horn soundable for providing said audibly perceptible alarm at a pitch, frequency and intensity effective for alerting said disembarked passengers; and
    sounding at least one said horn to provide said audibly perceptible alarm.

9. The method of claim 8 wherein a first horn is provided adjacent said door of said vehicle.

10. The method of claim 9 wherein a second horn serially-coupled to said first horn is provided adjacent the passenger-side rear wheel well of said vehicle.

11. The method of claim 1 wherein said alarm is intermittently provided in correspondence with the imminence of the departure of said vehicle.

12. The method of claim 1 wherein the pitch of said alarm is varied in correspondence with the imminence of the departure of said vehicle.

13. The method of claim 1 wherein said duration of said audibly perceptible alarm is from about 3 to 30 seconds.

14. The method of claim 13 wherein said duration of said audibly perceptible alarm is from about 5 to 15 seconds.

15. The method of claim 1 further comprising the steps of:
    extending a crossing arm from a retracted to an extended orientation effective for directing said disembarked passengers to cross in front of said vehicle at a distance placing them within the unobstructed view of an operator of said vehicle, said crossing arm extended in response to said door opened condition; and
    retracting said crossing arm from said extended to said retracted orientation a select time interval after said actuating of said door to said closed condition after said passengers have disembarked.

16. The method of claim 15 wherein said select time interval of said crossing arm corresponds to said duration of said audibly perceptible alarm.

17. The method of claim 1 further comprising the steps of:

extending a stop arm from a retracted to an extended orientation effective for visibly signally said stopping of said vehicle and said debarkation of said passengers therefrom, said stop arm extended in response to said door opened condition; and retracting said stop arm from said extended to said retracted orientation a select time interval after said actuating of said door to said closed condition after said passengers have disembarked.

18. The method of claim 17 wherein said select time interval of said stop arm corresponds to said duration of said audibly perceptible alarm.

19. The method of claim 1 further comprising the steps of:

extending a crossing arm from a retracted to an extended orientation effective for directing said disembarked passengers to cross in front of said vehicle at a distance placing them within the unobstructed view of an operator of said vehicle, said crossing arm extended in response to said door opened condition;

retracting said crossing arm from said extended to said retracted orientation a select time interval after said actuating of said door to said closed condition after said passengers have disembarked;

extending a stop arm from a retracted to an extended orientation effective for visibly signally said stopping of said vehicle and said debarkation of said passengers therefrom, said stop arm extended in response to said door opened condition; and retracting said stop arm from said extended to said retracted orientation a select time interval after said actuating of said door to said closed condition after said passengers have disembarked.

20. The method of claim 19 wherein said select time interval of said stop arm and said select time interval of said crossing arm correspond to said duration of said audibly perceptible alarm.

21. In a vehicle for carrying passengers having a door actuatable from a closed to an opened condition for the egress of said passengers, a method for warning disembarked passengers of the impending departure of said vehicle comprising the steps of:

stopping said vehicle at a predetermined location for passenger debarkation;

actuating said door to said opened condition to allow said passengers to disembark;

actuating said door to said closed condition after said passengers have disembarked;

providing an audibly perceptible alarm of a select duration to said disembarked passengers upon said actuating of said door to said closed condition;

providing a timer means for determining said duration of said audibly perceptible alarm, said timer means responsive to said door opened condition to reset from a timed to an untimed state and responsive to said door closed condition to revert from said untimed to said timed state after a select time interval;

resetting said timer means from said timed to said untimed state in response to said actuating of said door to said opened condition; and reverting said timer means from said untimed to said timed state after said select time interval in response to said actuating of said door to said door closed condition, said duration of said audibly perceptible alarm corresponding to the duration of said timer means select time interval.

* * * * *